United States Patent [19]

Saffin von Corpon

[11] 4,108,208
[45] Aug. 22, 1978

[54] MIXING TAP

[76] Inventor: Paul Saffin von Corpon, 1, Rue du Village, Genthod, Geneva, Switzerland, 1294

[21] Appl. No.: 770,746

[22] Filed: Feb. 22, 1977

[51] Int. Cl.² .......................... F16K 11/18; F16K 5/06
[52] U.S. Cl. ............................ 137/636.3; 137/625.41; 251/172
[58] Field of Search .................. 137/636.3, 625.41; 251/172, 315

[56] References Cited

U.S. PATENT DOCUMENTS

| | | | |
|---|---|---|---|
| 2,845,949 | 8/1958 | Parker | 137/625.41 |
| 3,506,036 | 4/1970 | Hare | 137/636.3 |
| 3,823,742 | 7/1974 | Von Corpon | 137/636.3 |

*Primary Examiner*—Martin P. Schwadron
*Assistant Examiner*—Richard Gerard
*Attorney, Agent, or Firm*—Haseltine, Lake & Waters

[57] ABSTRACT

A mixing tap comprising a tap body with hot and cold water inlets and an outlet all leading into embossments in a hollow spherical configuration on which a spherical control member is swivelably mounted. The control member has an inner mixing chamber with two peripheral openings which selectively cooperate with the liquid inlet ducts to adjust the hot/cold water mixture according to the inclination of the handle, and a third opening which leads to the outlet duct, a flow-setting valve in the mixing chamber being controlled by screwing the handle. Flexible annular lips integral with the embossments about the inlet ducts, and a flexible tongue fitted around an opening in the tap body through which the handle passes, are pressed by the liquid pressure against the control member to provide fluid-tightness.

8 Claims, 15 Drawing Figures

MIXING TAP

The invention relates to manually adjustable mixing taps comprising a tap body with two liquid inlets and at least one outlet, a spherical control member fluid-tightly swivelably mounted inside the tap body, and a single manoeuvring handle fixed to the control member. In a known tap of this type, the control member has an internal mixing chamber and a valve for adjusting the output rate of the tap, the handle having a screw means for actuating the valve in any position of the control member. The latter has at least three peripheral openings for the inlet and the outlet of liquids into and from the mixing chamber, whereas the tap body has ducts cooperating with said inlet and outlet openings of the control member to selectively connect, when the valve is open, the liquid inlet and outlet openings as a function of the position of the control member.

A manually-adjustable mixing tap of this type is described, for example, in Swiss Pat. Nos. 530,577 and 537,546.

The invention concerns a manually-adjustable mixing tap of this type, characterized in that it further comprises annular lips carried by the tap body, each annular lip surrounding one of the liquid inlet ducts at a location facing the control member, and a flexible annular tongue disposed in an annular chamber formed between the control member and the tap body, said annular chamber communicating with the liquid inlets and surrounding an opening of the tap body through which said handle passes, said lips and tongue being fluid-tightly applied on the spherical surface of the control member by pressure of the liquids to provide fluid-tightness between the control member and the tap body.

The accompanying drawings show, by way of example, an embodiment of mixing tap according to the invention. In the drawings.

Figure 3:
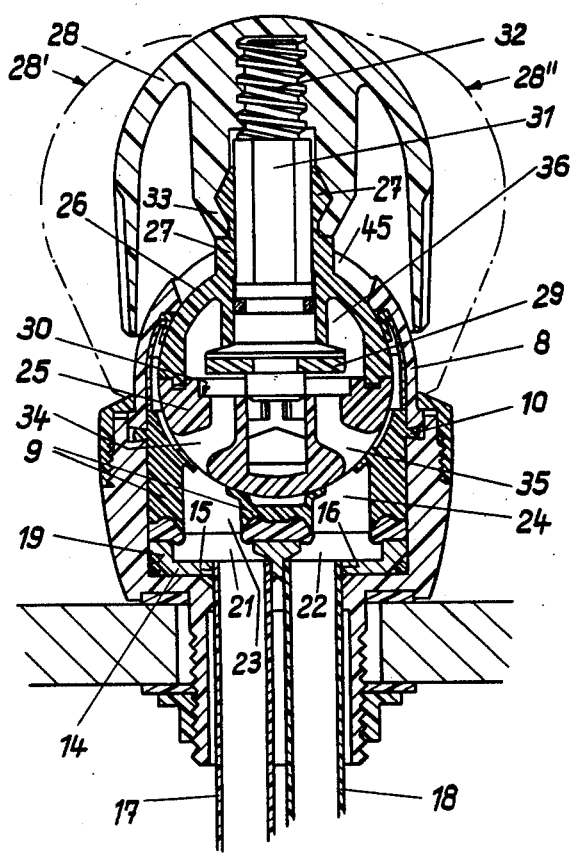
FIG. 3 is a cross-section along line 3—3 of FIG. 2.
Figure 4:
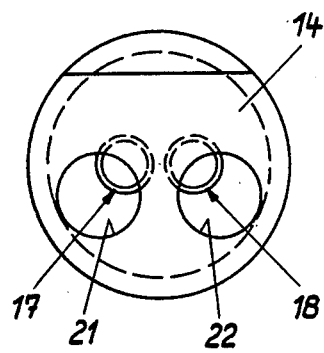
FIG. 4 is a plan view of a detail of FIG. 3.
Figure 5:
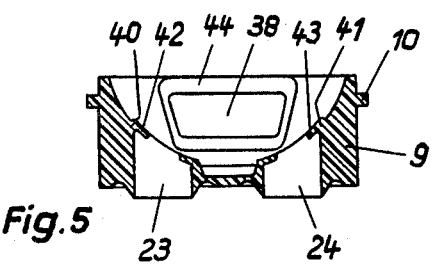
Figure 6:
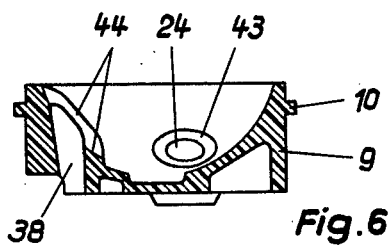
Figure 8:
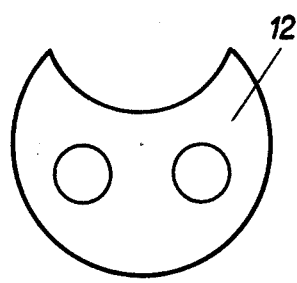
Figure 7:
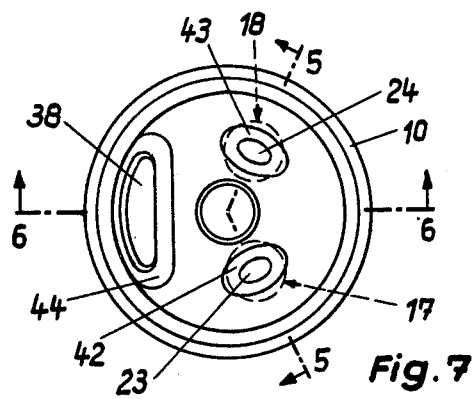
Figure 9:
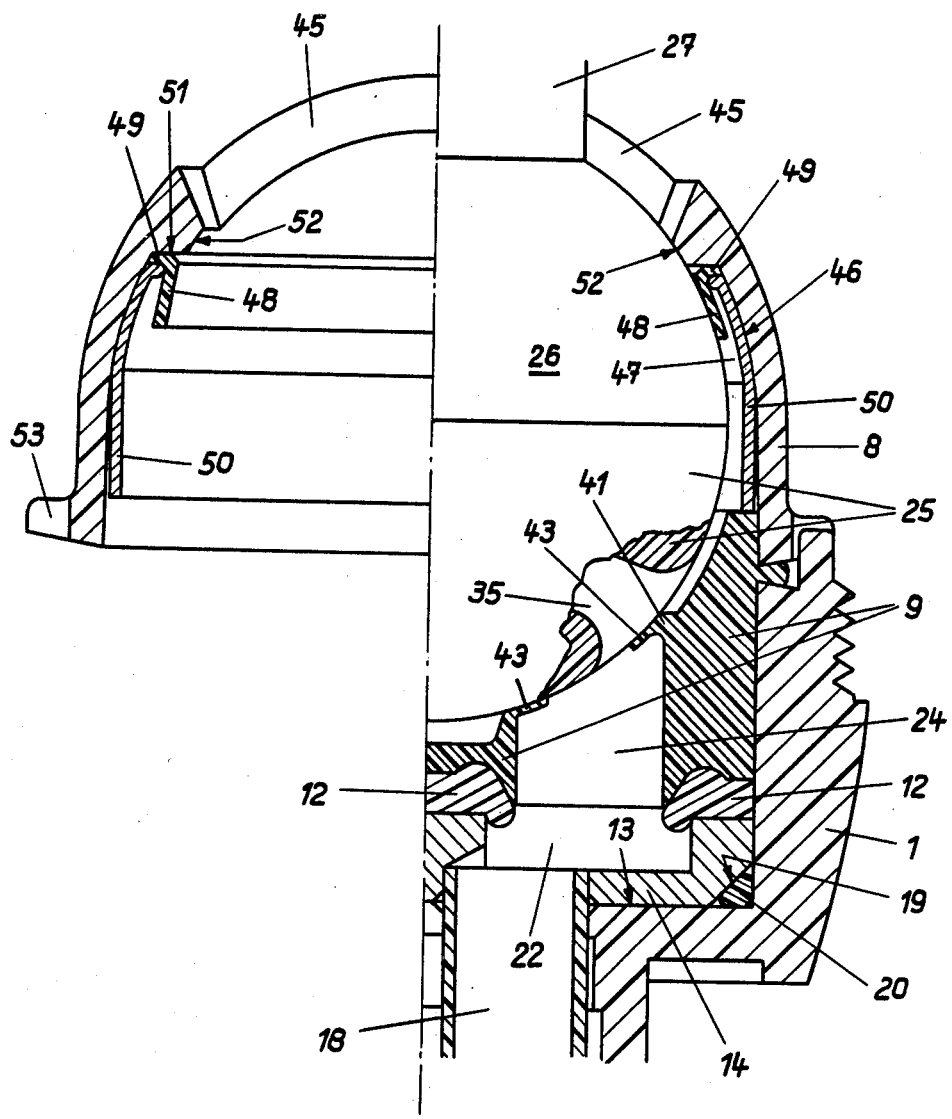
Figure 13:
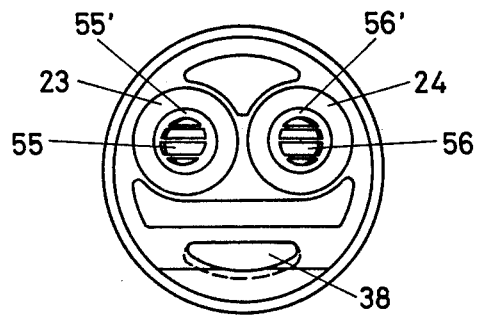
Figure 11:
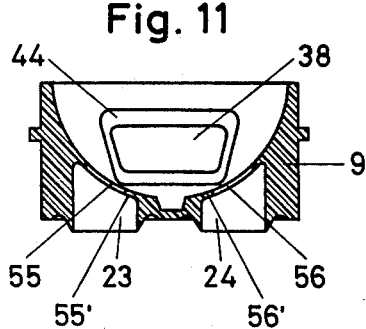
Figure 12:
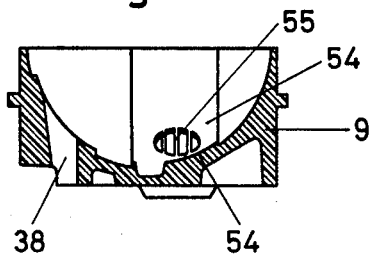
Figure 10:
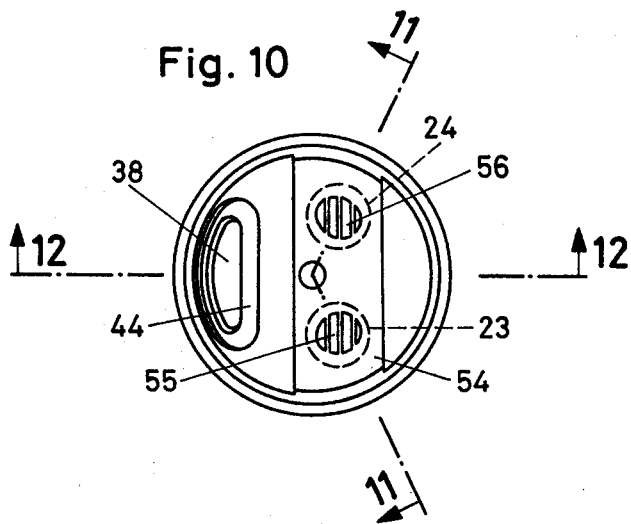
Figure 14:
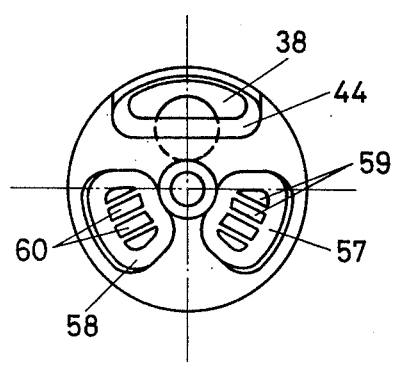

FIGS. 5 and 6 are cross-sections respectively along lines 5—5 and 6—6 of FIG. 7;

FIG. 7 is a view similar to FIG. 4 of another detail of FIG. 3;

FIG. 8 is a plan view of a joint;

FIG. 9 is an enlarged view of a part of FIG. 3;

FIGS. 10 to 12 are views similar to FIGS. 5 to 7 of a variation;

FIG. 13 is a view from underneath FIG. 11;

FIG. 14 is a view similar to FIG. 10 of another variation; and

Figure 15:
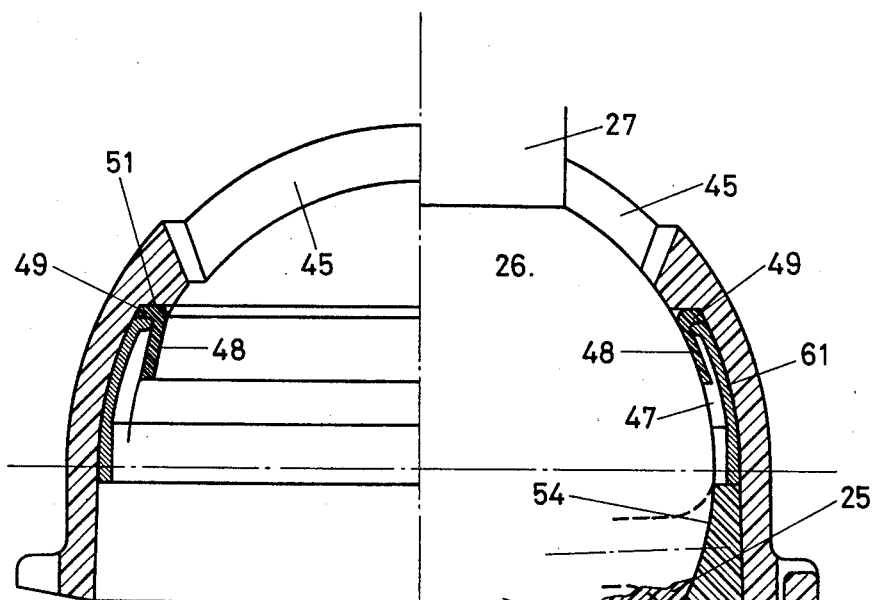

FIG. 15 is a view similar to FIG. 9 for the variation according to FIGS. 10 to 13.

The mixing tap shown in FIGS. 1 to 9 comprises a tap body including a piece 1 which is fixed on a support 2 which may be a wash-basin or a bath having a hole 3 receiving a threaded tubular part 4 of the piece 1 on which a nut 4 is screwed to secure the piece 1 on the support 2 with two interposed washers 6, 7. The tap body also comprises a dome-like cap 8 and a piece 9, the latter being lodged inside piece 1. The piece 9 has a circular flange 10 which is lodged between the cap 8 and piece 1, a screw ring 11 being screwed on an external thread of the piece 1 to assemble the pieces 1, 8 and 9. Inside the piece 1 below the piece 9 is disposed a plastic joint 12 shown in plan in FIG. 8. Between joint 12 and the bottom 13 of the interior of piece 1 is located a metal plate or disc 14 having two holes 15, 16 inside which are respectively welded the ends of two liquid-delivery pipes 17, 18 (for hot water and cold water for example). The disc 14 has a bevelled edge 19 and a plastic joint 20 is disposed in the annular space comprised between this edge 19 and the bottom of the interior of piece 1 (FIG. 9). The disc 14 has two circular recesses 21, 22 facing respective ducts 23, 24 in the piece 9.

Figure 1:
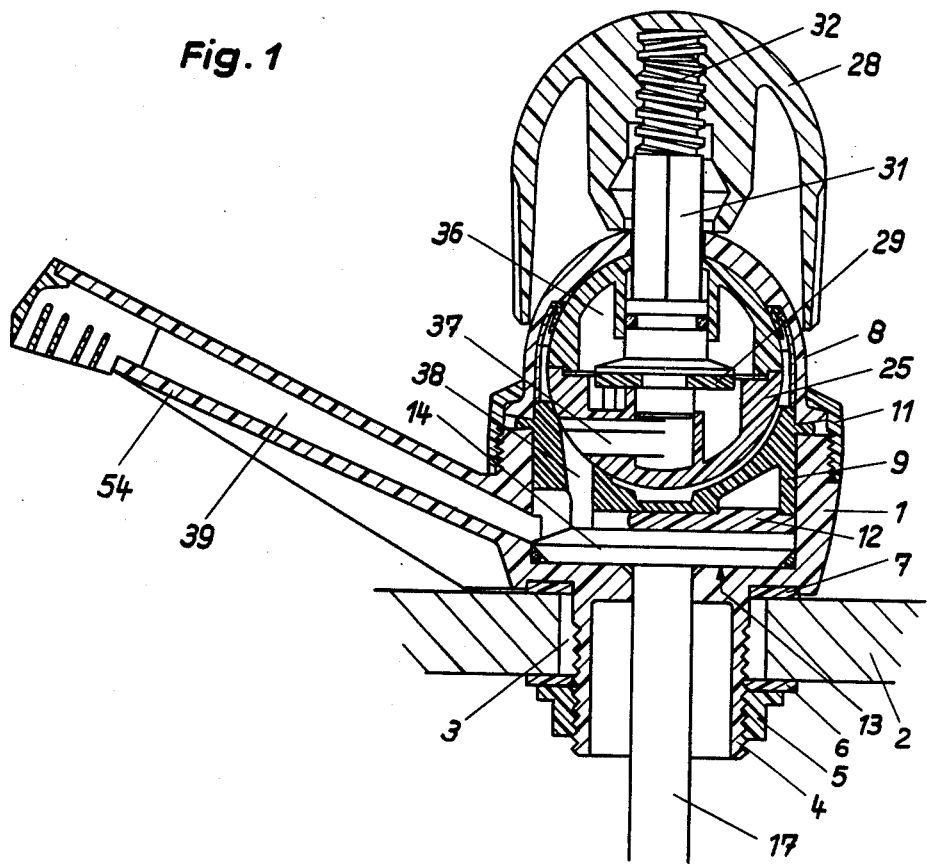
FIG. 1 is a cross-section along line 1—1 of FIG. 2.

The cap 8 and piece 9 together define a generally spherical space inside which is disposed a spherical control member comprising two generally hemispherical parts 25 and 26. The part 26 has two extensions 27 on which an actuating handle 28 is secured but is able to turn. The handle 28 serves, as will be seen later, to adjust the mixture of the two liquids delivered by pipes 17 and 18 and also to adjust the outlet rate of mixed liquids from the tap. Inside the spherical control member, an axially movable valve 29 cooperates, when it is in a closed position, with a seat 30. FIG. 1 shows valve 29 in the closed position and FIG. 3 in an open position. Valve 29 is fixed on a rod 31 of prismatic shape arranged to slide without turning inside the two extensions 27. The prismatic rod 31 is extended by a screw 32 cooperating with an internal threading of the handle 28. The latter has an annular part 33 elastically grip fitted in a corresponding peripheral groove of the parts 27 to ensure axial immobilization of this handle in relation to the control member and the tap body. Thus, by turning the handle 28 in one direction or the other, the valve 29 is opened or closed, as is known.

In the part 25 of the spherical control member are provided two ducts 34, 35 which cooperate respectively with ducts 23, 24 of the piece 9. When the valve 29 is open, the liquids delivered by pipes 17, 18 flow respectively into the ducts 23, 34 on the one hand and 24, 35 on the other hand to become mixed in a mixing chamber 36 in part 26 of the control member.

FIG. 5 shows the piece 9 alone in cross-section along line 5—5 of FIG. 7, i.e. according to FIG. 3.

Figure 2:
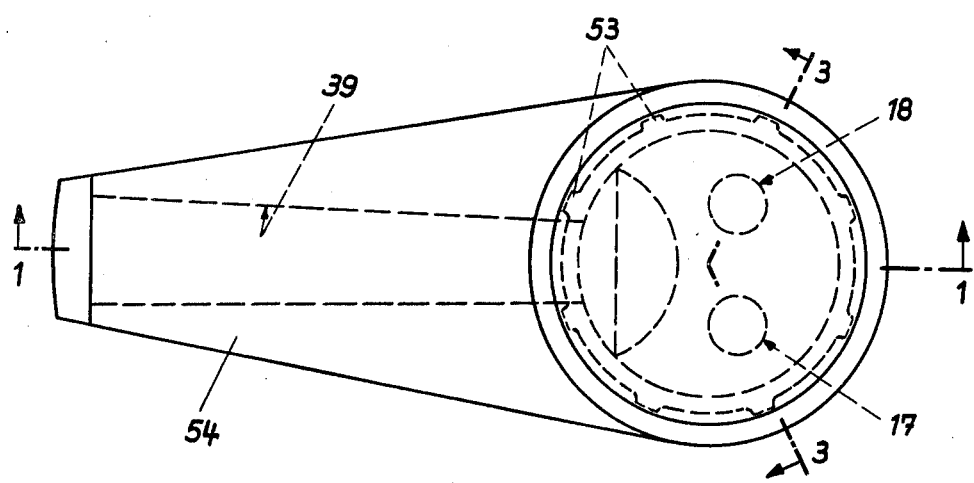
FIG. 2 is a schematic plan view corresponding to FIG. 1.

FIG. 6 shows this same piece 9 alone but in cross-section along line 6—6 of FIG. 7, i.e. according to FIG. 1, whereas FIG. 7 is a plan view corresponding to FIG. 6, hence corresponding to FIG. 2.

When the valve 29 is open it places the mixing chamber 36 into communication with a duct 37 in the part 25 of the spherical control member and which cooperates with an outlet duct 38 in the piece 9 leading to a duct 39 inside a delivery pipe 54 of the tap. This pipe 54 is integral with the part 1 of the tap body.

Thus, by opening the valve 29, the tap is able to operate, i.e. the liquids, for example hot and cold water, delivered by pipes 17, 18 mix and flow out by the duct 39. Also, by tipping the handle 28 between its extreme positions shown at 28' and 28" in FIG. 3, one varies the section of the passage open to the liquids between 23 and 34 on the one hand and 24 and 35 on the other hand. Inclination of the handle 28 thus enables progressive adjustment of the mixture of the two liquids arriving in the tap, whereas the rate of flow is adjusted by the degree of opening of the valve 29, i.e. by rotation of the handle 28 about its axis.

Fluid-tightness between the spherical control member and the tap body is provided by means which will now be described.

In the illustrated example, the piece 9, as incidentally are also the other parts of the tap body, is of moulded plastics material. The ducts 23 and 24 terminate facing the spherical control member inside respective embossments 40, 41 with which the part 25 of the spherical control member makes contact. At the locations where the ducts 23, 24 lead into the embossments 40, 41, there are provided flexible annular lips 42, 43 which also make contact with the spherical surface of piece 25.

Another embossment 44 is provided in the concave surface of piece 9 where the end of duct 38 is located. The hemispherical piece 25 bears on this embossment 44 at the same time as on the embossments 40, 41 which ensures that it is correctly held in position in relation to the piece 9, the lips 42, 43 being fluid-tightly applied against the spherical surface of the control member by the pressure of liquids in the respective ducts 23 and 24.

As to the duct 38 through which liquid leaves the tap, there is no need to provide a particular sealing means at the location of embossment 44. To the contrary, the following sealing means are provided at the location of an opening 45 provided in the cap 8 and through which the parts 27 of the actuating handle pass. This opening 45 is elongate and forms a guide for the handle at the same time as limiting its tipping movement.

Inside the cap 8 is provided an annular recess 46 (FIG. 9) which defines a chamber 47 between the cap 8 and the spherical control member when the tap is assembled. Inside chamber 47 is disposed an annular tongue 48 having a flange or heel 49. In chamber 47 is also disposed a metal ring 50 which, when the tap body is assembled, is compressed between the piece 9 and the heel 49 which is thus gripped against a shoulder 51 the cap 8. The tongue 48 contacts the spherical surface of the piece 26 and since the chamber 47, as shown, is in permanent communication with the ducts 23 and 24, the pressure of the delivered liquids acts on tongue 48 to constantly fluid-tightly apply it on the spherical control member. The tongue 48 hence prevents any leakage of liquid out of the opening 45.

In the space comprised between the sealing tongue 48 and the opening 45, the cap 8 has an annular embossment 52 on which the part 26 of the control member constantly bears and is guided.

As the spherical control member only contacts the surfaces of the embossments 52, 40, 41 and 44, which ensure that it is correctly supported, and the lips 42, 43 and the tongue 48, which ensure fluid-tightness, the friction between the control member and the tap body is reduced to a minimum. Also, as the flexible sealing lips and tongue are applied on the spherical control member with a force which is proportional to the pressure of the delivered liquids, the fluid-tightness is "self-acting".

To ensure the correct angular position of the cap 8 during assembly and to hold the cap in this position after assembly, there are provided, in the part of cap 8 on which the ring 11 acts, teeth 53 which engage in corresponding openings of piece 1.

In the variations shown in FIGS. 10 to 15 the same reference numerals are used to designate the same members as before.

FIGS. 10 to 13 show a variation of piece 9, in which the ducts 23, 24 terminate, facing the spherical control member, inside an embossment 54 in the shape of a hemispherical zone in the concave surface of the piece 9. Parallel slots 55, 56 are provided in the embossment 54 at the inner ends of the respective ducts 23 and 24. These slots 55, 56 form grids through which the liquids from the respective pipes 17 and 18 flow. The pressure of the liquids does not act solely on flexible annular lips as in the preceding embodiment, but on annular lips 55', 56' connected by the bars of the grids 55, 56. This arrangement enables the obtention of a good fluid-tightness between the spherical control member and the piece 9 without permanent deformation of the annular lips surrounding the liquid inlet ducts.

As in the example described with reference to FIGS. 1 to 9, the outlet duct 39 is provided in the piece 9 and its mouth is located inside an embossment 44. FIG. 13 shows the piece 9 from below, with the grids of the mouths of ducts 23 and 24 and the opening of duct 38 in the convex surface of piece 9.

The variation of FIG. 14 is distinguished from that shown in FIG. 10 by the fact that the single embossment 54 in the form of a concave spherical zone is replaced by two embossments 57, 58 formed in the piece 9 at the mouths of the ducts 23 and 24 respectively. These embossments 57 and 58 have slots 59, 60 respectively forming grids through which liquids flow from the respective ducts 23, 24 and whose bars connect the annular lips about the mouths of the ducts. The duct 38 with its embossment 44 is identical to that of FIG. 10.

FIG. 15, which is a view similar to FIG. 9 for the variation of the piece 9 of FIGS. 10 to 13, shows how fluid-tightness is provided between the spherical control member 25, 26 and the tap body for different positions of the control member.

This fluid-tightness is improved by the fact that the piece 9 comes into contact with the control member by the intermediate of the enlarged embossment 54.

Also, the dimensions of the metal ring 61 are reduced compared to the embodiment of FIG. 9.

In other variations, the disc 14 could be in plastics material and ultrasonically welded to the metal pipes 17 and 18, or the disc 14 and pipes 17, 18 could all be in plastics material and welded ultrasonically.

In yet another variation, the ring 50 could be of plastics material instead of metal and it could even be integral with the annular lip or tongue 48.

For the variation shown in FIG. 15, instead of communicating permanently with the annular chamber 47, the inlet ducts 23, 24 communicate with the annular chamber 47 via the mixing chamber (36) so that the tongue 48 only comes into action when the valve 29 is in the open position.

What is claimed is:

1. A manually-adjustable mixing tap of the type comprising a spherical control member fluid-tightly swivelably mounted inside a tap body and carrying a manoeuvring handle comprising screw means for actuating a valve mounted in an inner mixing chamber of the control member, the control member having at least three peripheral openings for the inlet and outlet of liquids into and from the mixing chamber, said tap body having ducts cooperating with and selectively connecting said liquid inlet and outlet openings as a function of the position of the control member, the rate of flow from the mixing chamber being a function of the position of the valve, annular lips carried by the tap body, each annular lip surrounding one of the liquid inlet ducts at a location facing the control member, and a flexible annular tongue disposed in an annular chamber formed between the control member and the tap body, said annular chamber communicating with the liquid inlet ducts and surrounding an opening of the tap body through which said handle passes, said lips and tongue being fluid-tightly applied on the spherical surface of the control member by pressure of the liquids to provide fluid-tightness between the control member and the tap body.

2. A tap according to claim 1, in which the tap body is made of plastic material and said lips are integral with embossments on part of the tap body at an end of each inlet duct.

3. A tap according to claim 1, in which said tongue is independent of the tap body and has a heel portion, and comprising means disposed in said annular chamber for holding said tongue by pressure on its heel portion against a wall of said chamber.

4. A tap according to claim 3, in which said tongue is made of plastic material, and said holding means comprises a ring.

5. A tap according to claim 2, in which the tap body comprises an annular embossment between said annular chamber and said opening for passage of the handle, the spherical control member being held by contact with said annular embossment, with said embossments surrounding the inlet ducts and with a further embossment surrounding the mouth of the liquid outlet duct.

6. A tap according to claim 1, in which the spherical control member is formed of two pieces of plastic material, the tap body also being formed of pieces of plastic material, and comprising a plate having openings in which are welded the ends of liquid-delivery pipes, said plate being disposed in the tap body with sealing joints interposed between said plate and the tap body.

7. A tap according to claim 1, in which the tap body includes a piece having a concave generally hemispherical surface provided with an embossment forming a concave hemispherical zone supporting the control member, the liquid-delivery ducts leading into said embossment, and said annular lips of the liquid-delivery ducts each being connected by bars forming a grid through which the liquid of the respective duct flows.

8. A tap according to claim 1, in which the tap body includes a piece having a concave generally hemispherical surface provided with two embossments at the mouths of the liquid-delivery ducts and supporting the spherical control member, each of said embossments having slots forming a grid through which the liquid of the respective duct flows.

* * * * *